United States Patent [19]
Mueller et al.

[11] Patent Number: 5,469,055
[45] Date of Patent: Nov. 21, 1995

[54] ENGINE SHAFT WITH INTEGRALLY FORMED COMPLEMENTARY TARGETS

[75] Inventors: Douglas L. Mueller; Gustavo L. Sumcad, both of Freeport, Ill.

[73] Assignee: Honeywell Inc., Minneapolis, Minn.

[21] Appl. No.: 238,106

[22] Filed: May 4, 1994

[51] Int. Cl.⁶ .................................. G01B 7/30; G01D 5/12
[52] U.S. Cl. ............... 324/207.21; 123/617; 324/207.22; 324/207.25
[58] Field of Search .................................... 324/173, 174, 324/207.2, 207.21, 207.22, 207.25, 207.26; 123/612, 617

[56] References Cited

U.S. PATENT DOCUMENTS

| | | |
|---|---|---|
| 3,597,687 | 8/1971 | Seipp ........................................ 324/173 |
| 3,719,841 | 3/1973 | Ritsema ................................ 324/174 X |
| 3,835,373 | 9/1974 | Matula .................................. 324/207.2 |
| 4,204,158 | 5/1980 | Ricouard et al. ..................... 324/207.2 |
| 4,506,217 | 3/1985 | Rothley et al. . | |
| 4,570,118 | 2/1986 | Tomczak et al. . | |
| 4,717,874 | 1/1988 | Ichikawa et al. ............... 324/207.22 X |
| 4,785,242 | 11/1988 | Vaidya et al. . | |
| 4,789,826 | 12/1988 | Willett . | |
| 5,041,784 | 8/1994 | Griebeler . | |
| 5,198,763 | 3/1993 | Konishi .......................... 324/207.22 X |

FOREIGN PATENT DOCUMENTS 2100443  12/1982  United Kingdom .............. 324/207.22

Primary Examiner—Gerard R. Strecker
Attorney, Agent, or Firm—William D. Lanyi

[57] ABSTRACT

A dual complementary target arrangement is provided which enables the targets to be formed as an integral part of a cam shaft. By machining first and second radially enlarged integral portions of a shaft, complementary targets are provided which each comprise segments of differing radial dimension measured from the central axis of the shaft. By permitting the formation of the rotatable targets as an integral portion of a cam shaft, the complementary targets can be incorporated as an integral portion of an automobile engine without necessitating the prefabrication of complementary targets and subsequent attachment of the targets to a cam shaft. Not only does the unitary structure of the cam shaft reduce the manufacturing costs of the target and shaft combination, but in certain applications it makes possible the use of complementary targets within the structure of an automobile engine where the use of individual components attached together would not be practical.

15 Claims, 8 Drawing Sheets

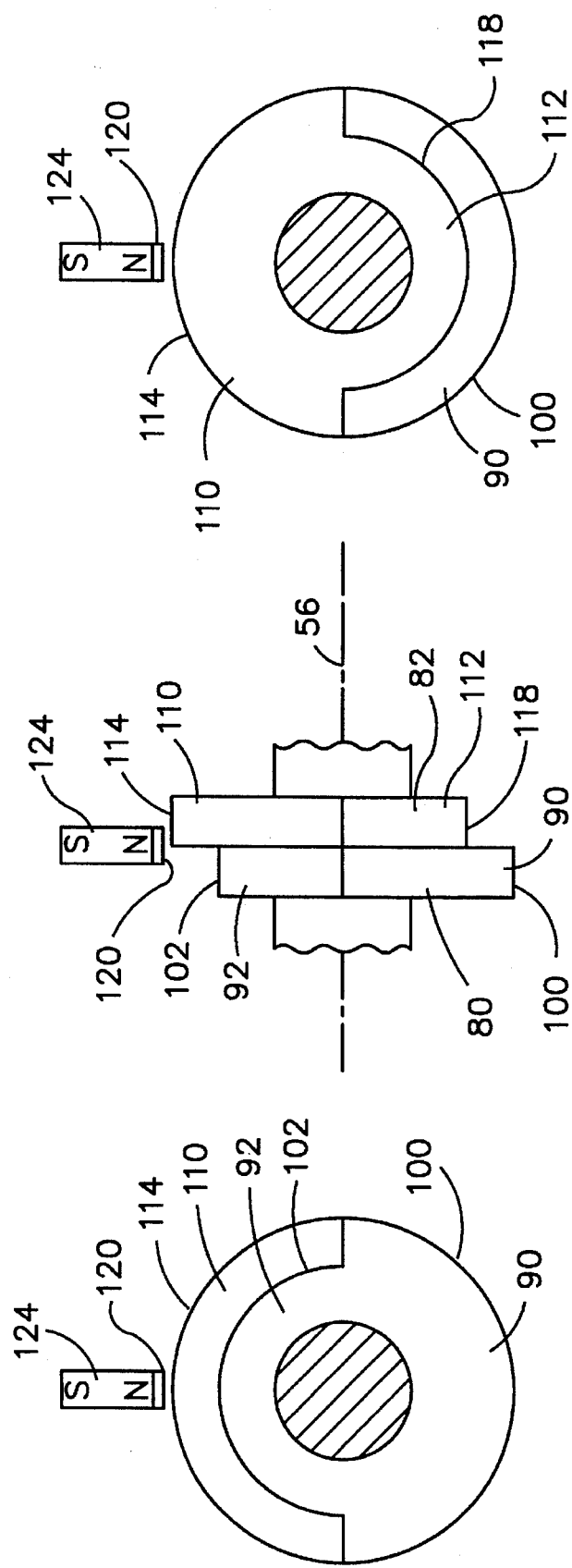

ENGINE SHAFT WITH INTEGRALLY FORMED COMPLEMENTARY TARGETS

BACKGROUND OF THE INVENTION

1. Field of the Invention

The present invention is generally related to complementary targets for use in conjunction with a magnetically sensitive component and, more particularly, an engine shaft that is machined to define first and second radially enlarged integral portions of the shaft which are shaped to define complementary target regions.

2. Description of the Prior Art

Many different types of geartooth sensors are known to those skilled in the art. Some geartooth sensors utilize a Hall effect element associated with a permanent biasing magnet. Others incorporate a magnetoresistive element, such as permalloy, combined with a permanent magnet that provides a biasing field. In certain applications, a single rotatable target, comprising a plurality of teeth and interstitial slots is used in conjunction with a geartooth sensor. One disadvantage of many single target geartooth sensors is that the device senses changes in a magnetic field and is unable to accurately determine whether a tooth or a slot is proximate the sensor upon start up. In order to overcome this deficiency, some geartooth sensor incorporate two rotatable targets, wherein each target comprises a plurality of teeth and slots. It is particularly advantageous if the two targets are complementary in nature. Throughout this description, targets are described as being complementary if the teeth of one target are disposed in circumferential alignment with the slots of the other target and vice versa. In an arrangement of this type, the complementary targets affect the geartooth sensor in opposite ways so that the tooth of one target distorts the magnetic field of the biasing magnet in a particular way which is generally opposite to the distortion when the tooth of the other target moves into a position proximate the sensor. This complementary nature of the targets permits power up recognition capability and also facilitates the accurate determination of the angular position of a shaft to which the complementary targets are attached.

U.S. Pat. No. 4,789,826, which issued to Willett on Dec. 6, 1988, discloses a system for sensing the angular position of a rotatable member using a Hall effect transducer. The angular position of the member, such as the shaft of a tension arm assembly, is sensed by the combination of a circular type of magnet secured to the rotatable member and selectively polarized relative to its diameter to define a magnetic north-south pole pair and a stationary Hall effect transducing device secured in close and constant proximity to the ring magnet. In a preferred embodiment of this device, the Hall effect transducing device is located in the region of a magnetic null of the field generated by the magnetic poles when the rotatable member is in a selected angular position.

U.S. Pat. No. 4,785,242, which issued to Vaidya et al on Nov. 15, 1988, discloses a position detecting apparatus which uses multiple magnetic sensors for determining relative and absolute angular position of a rotating shaft. A position detecting apparatus utilizes a first magnetic sensing device for accurately determining the angular position of a rotor and a second magnetic sensing device for absolutely determining the angular position of the rotor. The first sensing device includes a first target operatively associated with the rotor so as to rotate therewith and also includes a first sensor disposed at a fixed distance from the first target independent of the absolute angular position of the rotor to define a first air gap therebetween and a first magnet is disposed in proximity to the first target and the first sensor to create a first magnetic field in the first air gap.

U.S. Pat. No. 4,506,217, which issued to Rothley et al on Mar. 19, 1985, describes a geartooth position and speed sensor with four bridge circuit connected magnetic resistance tracks. Four meander-arranged permalloy resistance tracks are located on a substrate at the corners of a rectangle. They are spaced in a circumferential direction by approximately half of the pitch distance of the teeth of a starter gear. The resistances are connected together in a voltage divider configuration or in the form of a bridge circuit supplied from a constant current source.

U.S. Pat. No. 4,570,118, which issued to Tomczak et al on Feb. 11, 1986, discloses an angular position transducer which includes permanent magnets and a Hall effect device. The transducer for creating an electrical signal proportional to the angular position of a member pivotably mounted on a given axis includes an element that is pivoted directly by the member and contains a means for creating a flux field linearly varying in intensity along a given operating line extending in an air gap between spaced portions and having a preselected arcuate shape. A linear Hall effect device, with an output voltage proportional to the intensity of the flux field in which the device is exposed, is mounted at a fixed position on the operating line and in the air gap. Consequently, as the element is pivoted by the monitored member, the output voltage from the Hall effect device varies proportionally to the position of the Hall effect device along the operating line.

U.S. Pat. No. 5,041,784, which issued to Griebeler on Aug. 20, 1994, describes a magnetic sensor with a rectangular field distorting flux bar. The sensor is for use in measuring the position, velocity or direction of movement of an object having alternating zones of magnetic conductivity with a permanent magnet member having a pole face facing the moving object and having an axis transverse to the direction of movement thereof. A ferromagnetic strip of high permeability is mounted on the face of the magnet coaxial therewith having a length dimension in the direction of movement of the object greater than the width dimension transversed to the direction of movement. The ferromagnetic strip distorts the field of the permanent magnet member in the area of a pair of the sensor elements such that the flux lines in the area of each of the sensors are urged toward a transverse direction relative to the direction of movement of the object, whereby the flux field in the area of each of the sensors is uniform.

In patent application Ser. No. 08/099,296, which was filed by Wu on Jul. 29, 1993 and assigned to the assignee of the present application, a magnetoresistive element is used in conjunction with a complementary target arrangement in order to provide power up recognition in an angular position sensor. FIGS. 2A and 2B, which will be described in greater detail below, illustrate this arrangement which comprises two rotatable targets that are spaced apart from each other to define a gap therebetween. The rotatable targets are suitable for attachment to a shaft so that they rotate about a central axis in coordination with the shaft. The application of the magnetoresistive geartooth sensor permits the angular position of the shaft to be monitored. As the two rotatable targets rotate about the central axis, a tooth of one target passes the magnetoresistive sensing element simultaneously with a slot of the other target and vice versa. This coordinated movement of the teeth of one target with the slots of the other target advantageously distorts the magnetic field of a biasing magnet to facilitate the accurate determination of the position of both rotatable targets. The teeth provide ferromagnetic segments which distort the magnetic field and permit the magnetoresistive element to detect the movement of the targets. Patent application Ser. No. 08/099,296 is hereby explicitly incorporated by reference in this application.

Although the geartooth sensors described above provide a means for monitoring the angular position of a rotatable shaft, they possess a disadvantage in certain applications. The rotatable targets are individually machineable to define the teeth and slots and are subsequently attachable to each other and to the shaft in order that rotation of the shaft will be coordinated with rotation of the two targets. However, in certain applications, it is disadvantageous to require the individual manufacture of the targets and the additional operation of attaching the targets together and to the shaft. It would therefore be economically beneficial if a complementary target could be manufactured as an integral part of the rotatable shaft.

SUMMARY OF THE INVENTION

The present invention provides an angular position sensor that incorporates an integrally formed complementary target that is part of a shaft whose angular position is to be monitored. The angular position sensor arrangement of the present invention comprises a shaft with a central axis about which the shaft rotates. It also comprises a first radially enlarged integral portion of the shaft which has a first segment and a second segment. The first segment has a first surface located at a first radial distance from the central axis of the shaft and the second segment has a second surface at a second radial distance from the central axis of the shaft. In one particular embodiment of the present invention, the first segment represents a tooth which extends around approximately half of the circumferential dimension of the first radially enlarged integral portion of the shaft and the second segment represents a slot. Although one particular embodiment of the present invention comprises a single tooth rotatable target, it should be understood that the basic principles of the present invention could easily be expandable to define a multiple tooth and multiple slot rotatable target, The present invention further comprises a second radially enlarged integral portion of the shaft which has a third segment and a fourth segment. The third segment has a third surface at a third radial distance from the central axis of the shaft and the fourth segment has a fourth surface at a fourth radial distance from the central axis of the shaft.

The first and second radially enlarged integral portions of the shaft are disposed in axially adjacent relation with each other and, in a most preferred embodiment of the present invention, are machined from a single radially enlarged portion of the shaft. The first and second radially enlarged integral portions of the shaft each comprise ferromagnetic material and the two radially enlarged integral portions of the shaft are arranged so that the greater radial dimensions of one portion are proximate the lesser radial dimensions of the other portion and vice versa. In its basic form, each portion comprises a single tooth and a single slot, wherein the single tooth of one portion is circumferentially aligned with the single slot of the other portion and vice versa. However, as described above, it should be clear that the present invention can easily be expanded to comprise a plurality of teeth and slots in both of the radially enlarged integral portions wherein the teeth of one portion are circumferentially aligned with the slots of the other portion, and vice versa, to form a complementary target.

The present invention further comprises a magnetically sensitive device which is disposed proximate the first and second radially enlarged integral portions of the shaft and generally aligned with a plane which extends between the first and second radially enlarged integral portions of the shaft, wherein the plane is generally perpendicular to the central axis of the shaft.

In one particularly preferred embodiment of the present invention, the magnetically sensitive device comprises a magnetoresistive component which is made of a permalloy material. The shaft can comprise a plurality of cams formed on it. Although other applications are possible, one particular application of the present invention is in an automobile engine, wherein the shaft is a cam shaft of the automobile engine.

BRIEF DESCRIPTION OF THE DRAWINGS

The present invention will be more fully and completely understood from a reading of the Description of the Preferred Embodiment in conjunction with the drawings, in which:

FIGS. 4, 5 and 6 show three views of an embodiment of the present invention;

DESCRIPTION OF THE PREFERRED EMBODIMENT

Figures 1, 2A:
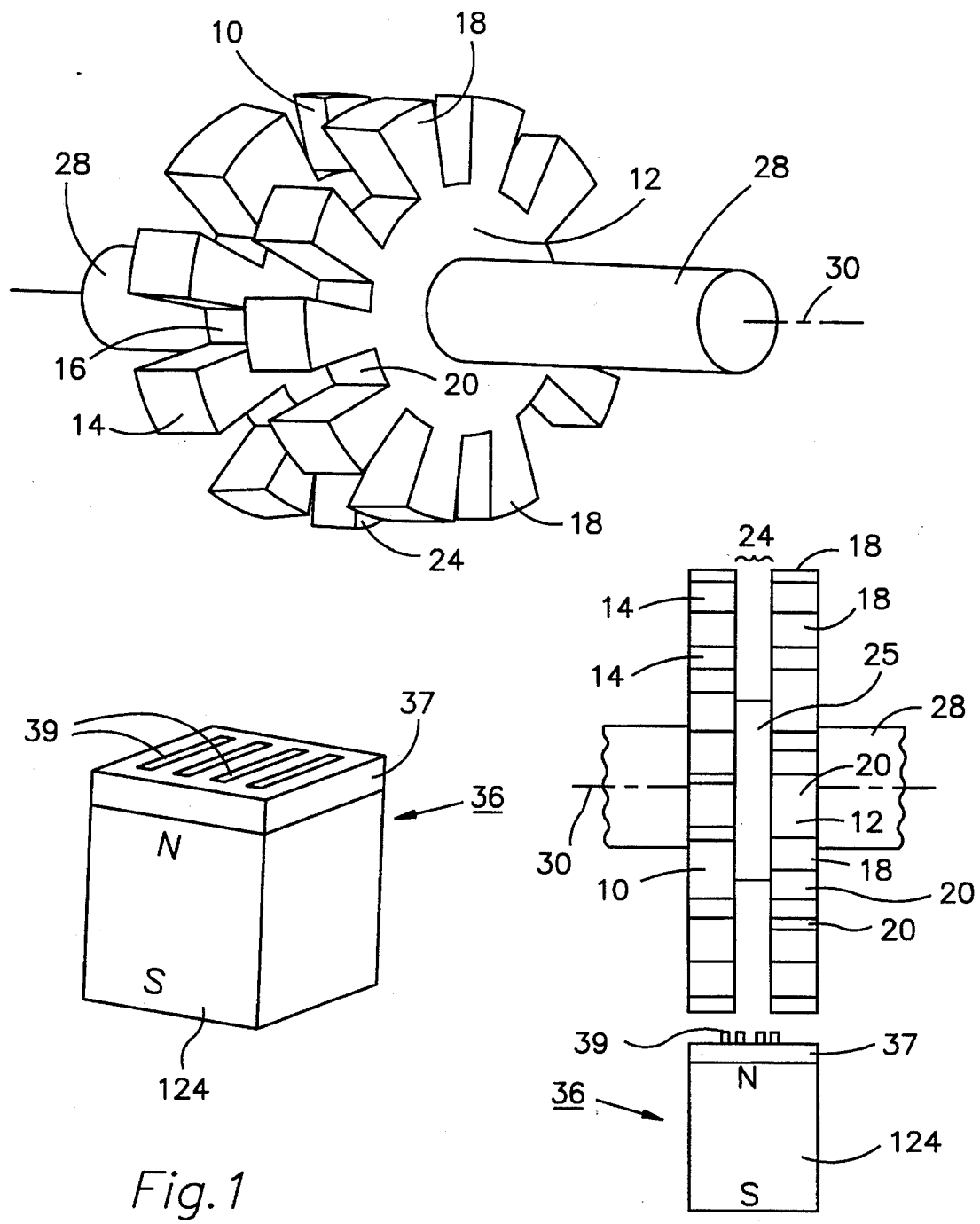
FIG. 1 illustrates two complementary targets arranged relative to each other with a gap therebetween.
FIGS. 2A and 2B are alternative views of FIG. 1.

Throughout the Description of the Preferred Embodiment, like components will be identified by like reference numerals.

FIG. 1 illustrates a pair of complementary rotatable targets such as that described in patent application Ser. No. 08/099,296 which was filed on Jul. 29, 1993 and described above. The complementary target arrangement comprises a first rotatable target 10 and a second rotatable target 12. The first rotatable target 10 comprises a plurality of teeth 14 and slots 16 which are interstitially associated with the teeth 14. The second rotatable target 12 similarly comprises a plurality of teeth 18 and slots 20. As can be seen in FIG. 1, the teeth 14 of the first rotatable target 10 are associated in circumferential alignment with the slots 20 of the second rotatable target 12. In other words, each tooth of one of the two rotatable targets is circumferentially aligned with a slot of the other rotatable target. The two targets are spaced apart by a gap 24 and both targets are rigidly attached to a rotatable shaft 28. When the shaft 28 rotates about its central axis 30, the two rotatable targets rotate in coordination with the shaft.

Figure 2B:
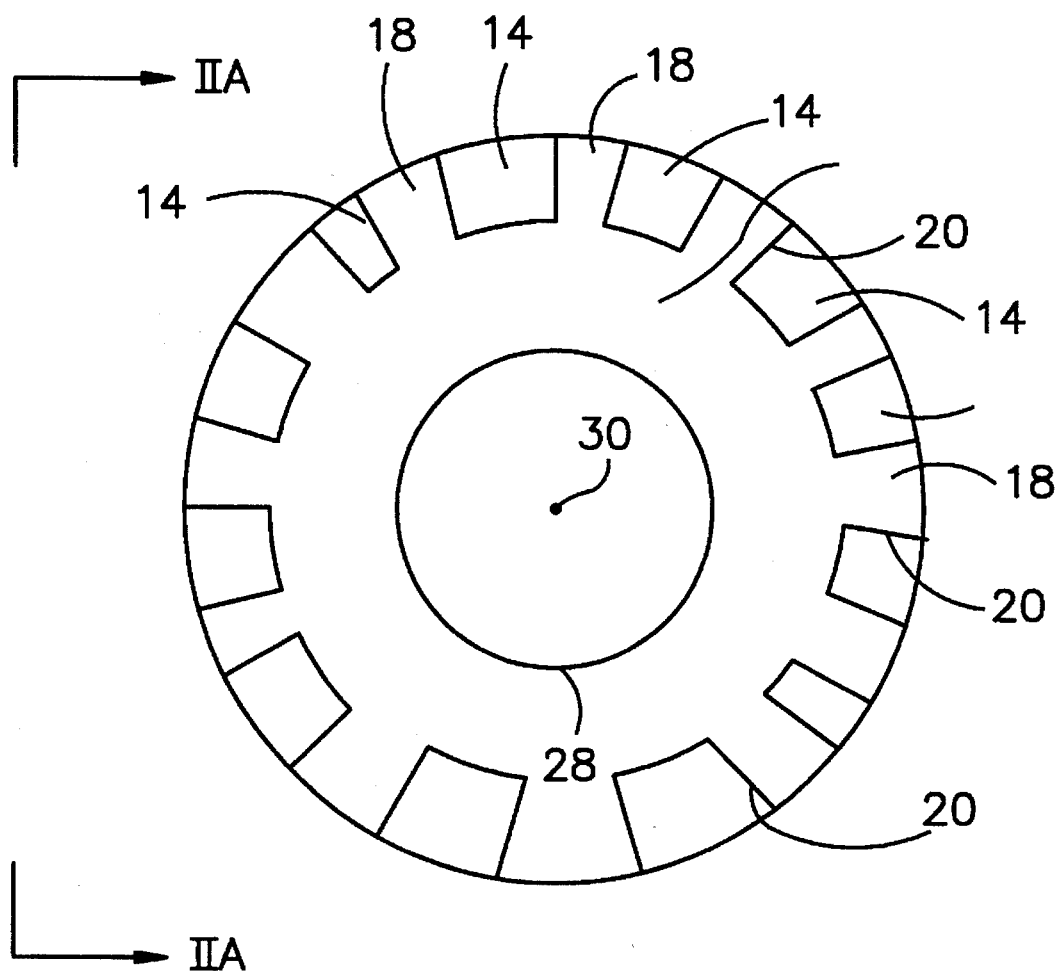

FIGS. 1 and 2A show the first 10 and second 12 rotatable targets associated with a magnetoresistive sensor 36. The operation of the magnetoresistive sensor 36 with the two complementary targets, 10 and 12, is described in detail in the referenced patent application and is well understood by those skilled in the art of magnetoresistive sensors. FIG. 2A is a side view of FIG. 2B. A substrate 37 is used to support the magnetoresistive elements 39.

As discussed above, dual complementary rotatable targets provide a significant advantage over single targets by permitting the sensor to determine the angular position of a shaft in a power up condition. However, many applications of complementary targets do not permit the mechanical attachment of the rotatable targets to the shaft. For example, if the complementary targets are to be used in conjunction with a cam shaft of an automobile engine, it is disadvantageous if the complementary targets have to be mechanically attached to the shaft. If the targets are to be disposed external to the engine body, subsequent attachment of the targets would require additional operations that increase the overall costs of the device. If, on the other hand, the complementary targets are to be disposed internal to the engine body, it is disadvantageous to have an attached part rotating with the cam shaft. Instead, it is highly preferred to have the cam shaft and all of its rotating components formed as a single shaft.

Figure 3:
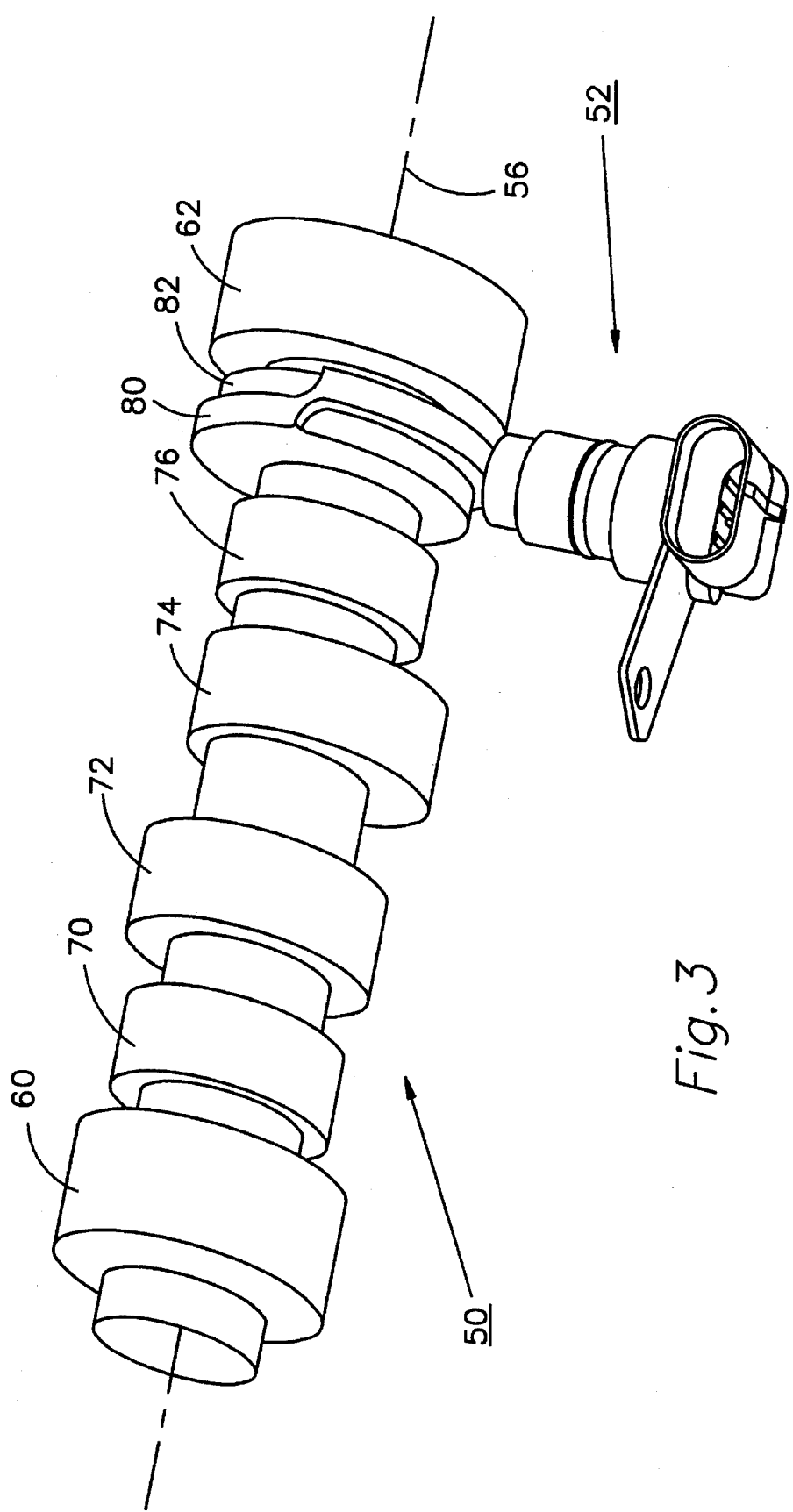
FIG. 3 shows a cam shaft associated with a geartooth sensor.

FIG. 3 illustrates an exemplary cam shaft 50 associated with a magnetoresistive geartooth sensor 52. The cam shaft 50 is disposed for rotation about a central axis 56. Two bearing surfaces, 60 and 62, are provided to permit the cam shaft 50 to be adequately supported within the structure of an automobile engine. A plurality of cams, 70, 72, 74 and 76, are shown formed as part of the cam shaft 50. A first radially enlarged integral portion 80 and a second radially enlarged integral portion 82 of the cam shaft 50 are shown in FIG. 3 disposed proximate the operative end of the geartooth sensor 52. The particular structure of the first and second radially enlarged integral portions of the shaft will be described in greater detail below.

FIG. 3 shows the general configuration of the cam shaft made in accordance with the present invention and also illustrates one of its most significant advantages. Because of the axial position of the complementary targets between the bearing supports of the shaft, it would be virtually impossible to manufacture the first and second rotatable targets separately and then subsequently attach them to the other portions of the cam shaft 50. The structural integrity of the overall cam shaft design would be significantly impaired and the required operation needed to attach the two rotatable targets to the other components of the shaft would disadvantageously increase the costs of the shaft and the automobile engine.

FIGS. 4, 5 and 6 show three views of the first and second radially enlarged integral portions of the shaft, 80 and 82, that are illustrated in FIG. 3. The first radially enlarged integral portion 80 of the shaft comprises a first segment 90 and a second segment 92. The first segment 90 has a first surface 100 disposed at a first radial distance from the central axis 56 and a second surface 102 disposed at a second radial distance from the central axis 56. The second radially enlarged integral portion 82 of the shaft comprises a third segment 110 and a fourth segment 112. The third segment 110 comprises a third surface 114 which is disposed at a third distance from the central axis 56. In addition, the fourth segment 112 comprises a fourth surface 118 which is disposed at a fourth distance from the central axis 56. A magnetoresistive element 120, such as that identified by reference numerals 37 and 39 above, is associated with a permanent magnet 124 to define a geartooth sensor such as that identified by reference numeral 52 in FIG. 3. The segments of the first and second radially enlarged integral portions of the shaft are associated with each other in a complementary manner so that the second segment 92 moves proximate the magnetoresistive component 120 simultaneously with the third segment 110. Similarly, as the shaft rotates about its central axis, 56, the first segment 90 moves proximate the magnetoresistive elements simultaneously with the fourth segment 112.

FIGS. 4, 5 and 6 illustrate how the various surfaces, 100, 102, 114 and 118 are associated together in complementary fashion to assure that the surfaces of the first and second radially enlarged integral portions of the shaft move past the magnetoresistive element 120 in a complementary manner. In other words, when the larger radially dimensioned surface of one portion moves past the sensor, the lesser radially dimensioned surface of the other moves past the sensor and vice versa. This complementary association of the two rotatable targets assures that the magnetic field of the permanent magnet 124 is always distorted in an advantageous way to permit accurate determination of the position of the shaft. Although the embodiment of the present invention shown in FIGS. 4, 5 and 6 comprises a single tooth and a single slot in both of the radially enlarged integral portions of the shaft, it should be understood that a plurality of teeth and slots could easily be provided by the basic concepts of the present invention described above.

If a device such as that illustrated in FIGS. 3, 4, 5 and 6 is to be manufactured without requiring attachment of one premachined component to another premachined component, some method must be provided which allows a single shaft to be machined in a manner which defines the shapes necessary to product the complementary targets illustrated in FIGS. 4, 5 and 6. Known machining techniques do not permit the device illustrated in FIGS. 4, 5 and 6 to be easily machined in an economical manner. Although the sharp corners and flat surfaces illustrated in FIGS. 4, 5 and 6 would be significantly advantageous in the operation of a complementary target, those sharp corners and flat surfaces are extremely difficult to machine and would disadvantageously increase the costs of the shaft. The present invention provides a complementary target arrangement that is more easily machineable while avoiding the inherent degradation in the operation of the geartooth sensor that would normally be expected if complementary targets are machined from a single shaft. Three embodiments of the present invention will be described below in conjunction with their methods of manufacture.

Figure 7:
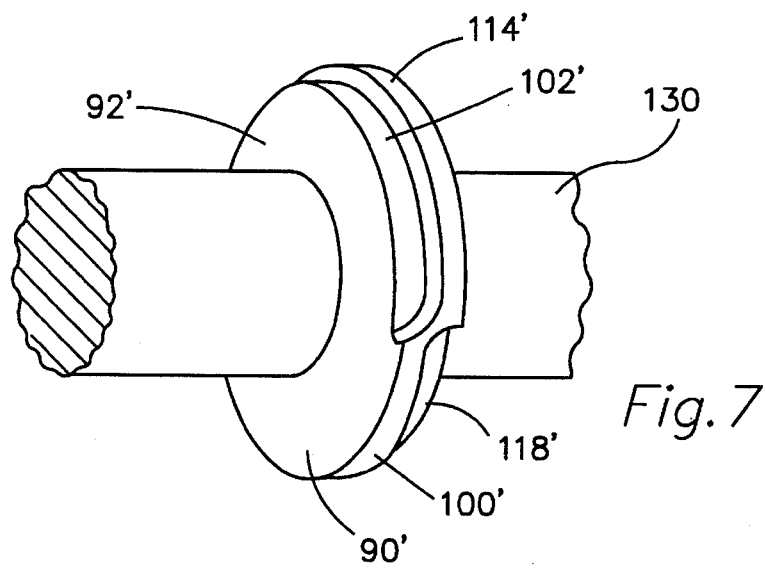
FIGS. 7, 8 and 9 show three views of a first preferred embodiment of the present invention.
Figures 8, 9:
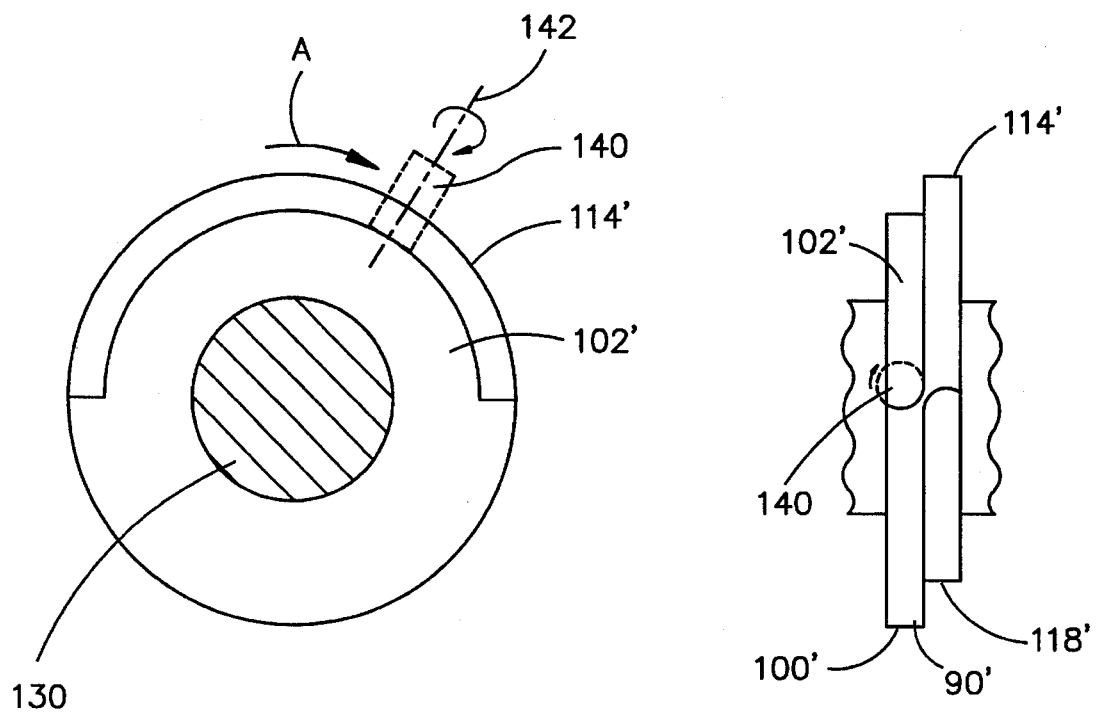

FIG. 7 illustrates a shaft 130 with a pair of radially enlarged integral portions extending therefrom. The segments are identified by primed reference numerals that are generally synonymous with those used above in FIGS. 4, 5 and 6. FIG. 8 is a side view of the perspective illustration of FIG. 7. As can be seen from the shape of the machined surfaces in FIG. 7, the second surface 102 can be formed by an end mill operation that is represented by dashed lines in FIG. 8. A flat bottom end mill 140 can be positioned to rotate about its axis of rotation 142 and then be moved relative to the shaft 130 in the direction of arrow A in FIG. 8. This machining operation results in the shape of the surfaces illustrated in the perspective view of FIG. 7. FIG. 9 is an end view of FIG. 8 and shows the manner in which the flat bottom, or flat end, milling cutter 140 results in the shape of the surfaces illustrated in FIGS. 7 and 8.

Figure 10:
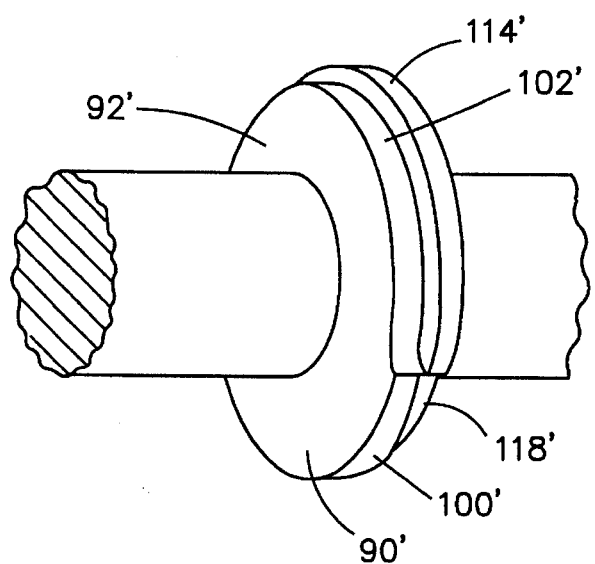
FIGS. 10, 11 and 12 show a second preferred embodiment of the present invention.
Figure 11:
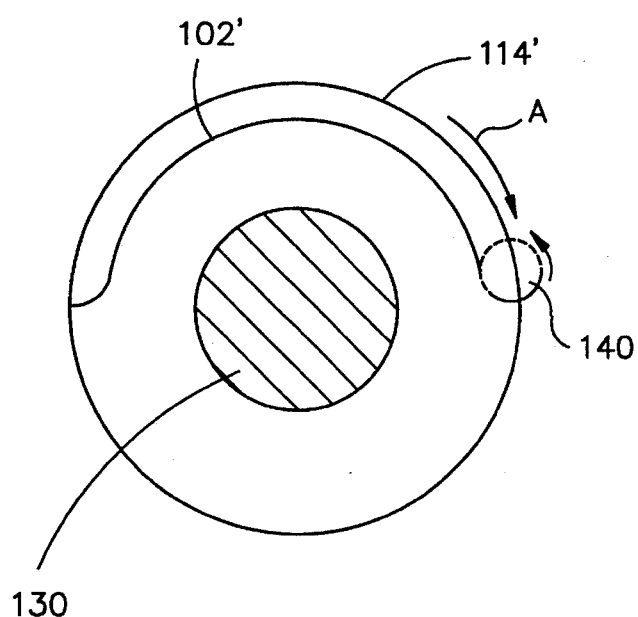
Figure 12:
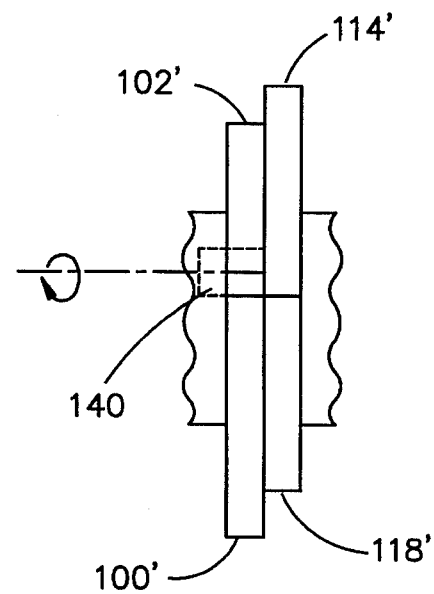

FIGS. 10, 11 and 12 illustrate the result of using a milling cutter arranged as shown by dashed lines in FIGS. 11 and 12. As can be seen, the axis of rotation of the milling cutter 140 is perpendicular to that described in conjunction with FIGS. 8 and 9. The shapes of the surfaces, 102' and 118', are noticeably different than the corresponding shapes shown in FIG. 7. It has been found that the configuration shown in FIG. 10 is advantageous over both the one shown in FIG. 7 and the one that will be described below in conjunction with FIG. 13. The relative complementary positions of the tooth and slot in FIG. 10 provide a distinct change from ferromagnetic material to nonferromagnetic material and this distinct change is advantageous because it permits the magnetoresistive sensor to very accurately determine the passage of a tooth and a slot proximate its operative detection zone.

Figure 13:
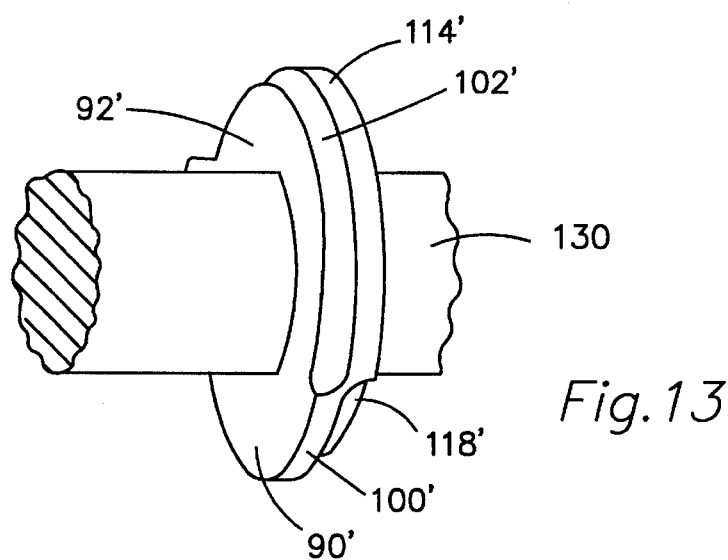
FIGS. 13, 14 and 15 show a third preferred embodiment of the present invention.
Figure 14:
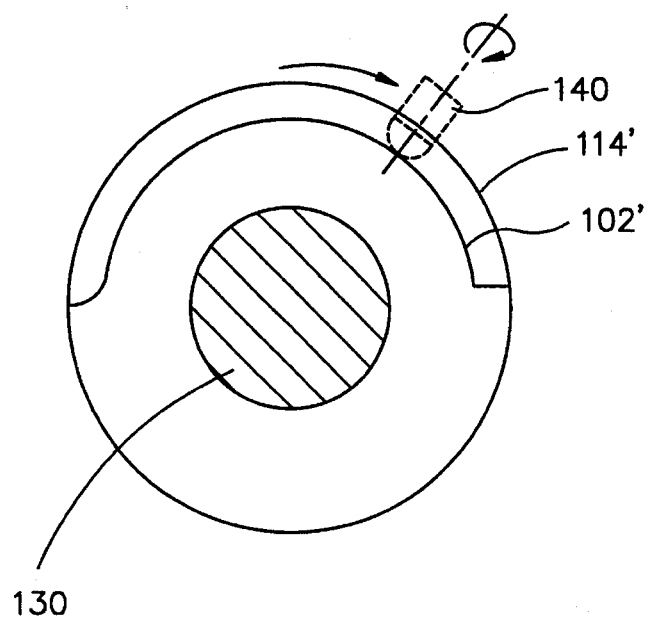
Figure 15:
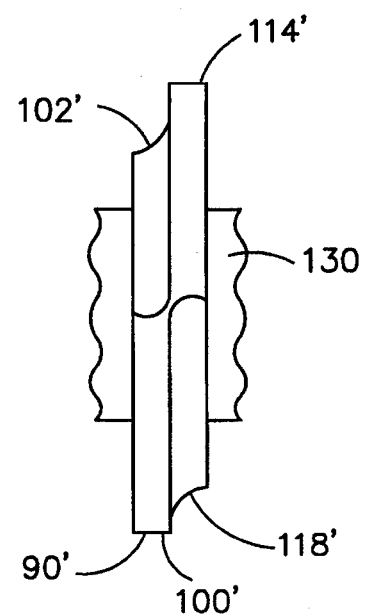

FIGS. 13, 14 and 15 illustrate the results of using a milling cutter with a spherical end portion. The ball end milling cutter is represented by dashed lines 140 in FIG. 14. FIG. 13 illustrates the results of this type of machining operation. The target shown in FIGS. 13, 14 and 15 can also be made by positioning the axis of the ball end mill at various angles between axial and radial.

It should be understood that, although the embodiments shown in FIGS. 7, 10 and 13 each provide signals that are adequate to determine the angular position of the shaft 130, they represent varying degrees of accuracy. If a milling cutter can be positioned as shown in FIG. 11, the surface shapes shown in FIG. 10 have been found to be preferable over those shown in FIGS. 7 and 13. However, in many applications of the present invention, a milling cutter is impossible to position with its axis of rotation parallel to the central axis of the shaft 130. The devices shown in FIG. 7 and FIG. 13 are compromises over the most preferable configuration shown in FIG. 10. If a flat faced milling cutter must be positioned with its axis of rotation perpendicular to the central axis of the shaft, as shown in FIGS. 8 and 9, the surface shapes shown in FIG. 7 are adequate to determine the angular position of the shaft, but are not as precise as that shown in FIG. 10. Similarly, if a spherical milling cutter is used as represented in FIG. 14, the surface shapes in FIG. 13 will be adequate, but not as accurate as those of FIG. 10.

Figure 16:
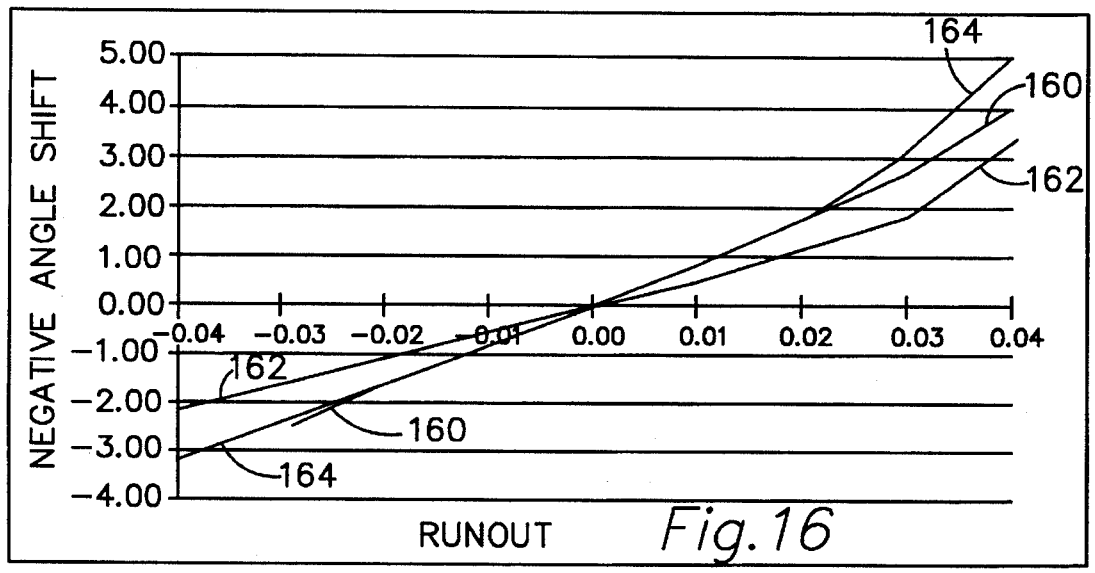
FIGS. 16 and 17 show the characteristic of the present invention related to the negative and positive edge angle shifts measured as a function of run out.
Figure 17:
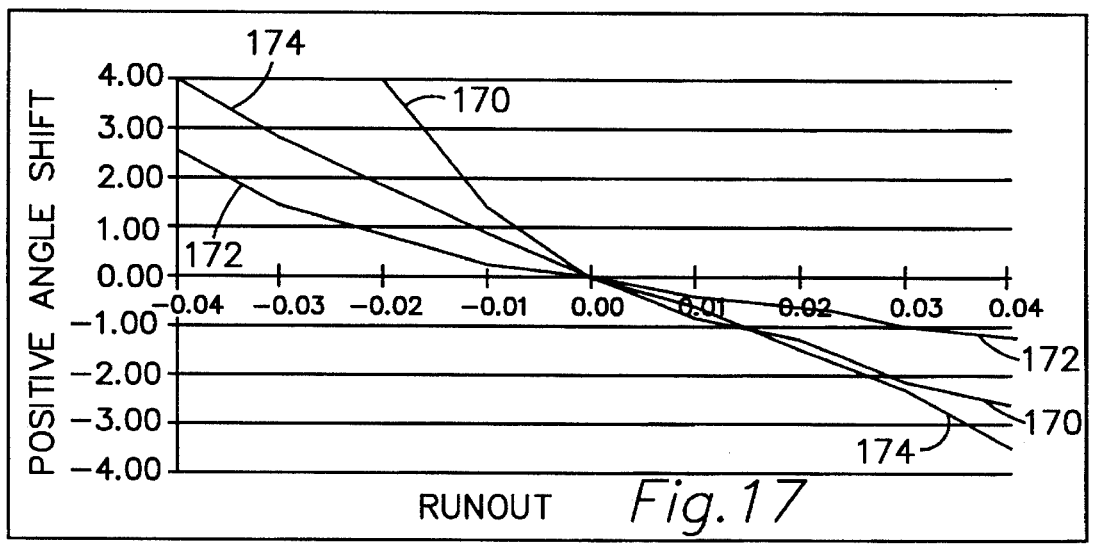

Tests have been performed with targets such as those shown in FIGS. 7, 10 and 13 to determine the angular shift in the signals received from a geartooth sensor as a function of runout. FIG. 16 represents the negative edge angle shift, measured in degrees, shown as a function of the run out, measured in inches. Three curves are shown in FIG. 16 which correspond with the target shapes shown in FIGS. 7, 10 and 13. The complementary targets shown in FIG. 7 are represented by curve 160, the complementary targets shown in FIG. 10 are represented by curve 162 and the complementary targets shown in FIG. 13 are represented by curve 164. As can be seen, curve 162 represents the most advantageous results because the complementary targets shown in FIG. 10 result in the smallest negative edge angle shift as a function of run out. Similarly, FIG. 17 shows the positive edge angle shift, in degrees, as a function of run out, in inches. The complementary target of FIG. 7 resulted in curve 170, the complementary target in FIG. 10 resulted in curve 172 and the complementary target in FIG. 13 resulted in curve 174. Again, it can be seen that the complementary target in FIG. 10, as represented by curve 172, is advantageous over the other two because it provides the minimum positive edge angle shift as a function of run out. Although FIGS. 16 and 17 show relative comparisons among the three embodiments of the present invention shown in FIG. 7, 10 and 13, it should be clearly understood that all three of these embodiments are applicable in certain situations. The comparisons shown in FIGS. 16 and 17 are provided only for the purpose of showing that certain shapes are preferable in certain circumstances and, as described above, the shapes shown in FIG. 10 appears to be preferable in the characteristic of minimizing the positive and negative edge angle shift as a function of run out. However, all embodiments of the present invention permit a complementary target to be formed as an integral portion of a cam shaft and represent significant advantages over the prior art.

Although the present invention has been described in considerable detail and illustrated with particular specificity to show three preferred embodiments, it should be understood that alternative embodiments are within the scope of the invention.

The embodiments of the invention in which an exclusive property or right is claimed are defined as follows:

1. An angular position sensor, comprising:

a single-piece rotatable shaft having a central axis;

a first radially enlarged integral portion of said shaft having a first segment and a second segment, said first segment having a first surface at a first radial distance from said central axis and said second segment having a second surface at a second radial distance from said central axis;

a second radially enlarged integral portion of said shaft having a third segment and a fourth segment, said third segment having a third surface at a third radial distance from said central axis and said fourth segment having a fourth surface at a fourth radial distance from said central axis, said first and second radially enlarged integral portions of said shaft being disposed in axially adjacent relation with each other, said first and second radially enlarged integral portions of said shaft each comprising ferromagnetic material, said first and second radially enlarged integral portions being formed from said single-piece rotatable shaft; and a magnetically sensitive device disposed proximate said first and second radially enlarged integral portions of said shaft and aligned with a plane which extends between said first and second radially enlarged integral portions of said shaft, said plane being generally perpendicular to said central axis.

2. The sensor of claim 1, wherein:

said magnetically sensitive device comprises a magnetoresistive component.

3. The sensor of claim 1, further comprising:

a plurality of cams formed as part of said shaft.

4. The sensor of claim 1, wherein:

said first and fourth segments are circumferentially aligned with each other in a complementary association with each other.

5. The sensor of claim 1, wherein:

said second and third segments are circumferentially aligned with each other in a complementary association with each other.

6. The sensor of claim 1, wherein:

said first, second, third and fourth surfaces each being formed in the shape of arcuate sections of a cylindrical surface.

7. An angular position sensor, comprising:

a single-piece rotatable shaft having a central axis;

a first radially enlarged integral portion of said shaft having a first segment and a second segment, said first segment having a first surface at a first radial distance from said central axis and said second segment having a second surface at a second radial distance from said central axis;

a second radially enlarged integral portion of said shaft having a third segment and a fourth segment, said third segment having a third surface at a third radial distance from said central axis and said fourth segment having a fourth surface at a fourth radial distance from said central axis, said first and second radially enlarged integral portions of said shaft being disposed in axially adjacent relation with each other, said first and second radially enlarged integral portions of said shaft each comprising ferromagnetic material, said first and fourth segments being circumferentially aligned with each other in a complementary association with each other, said second and third segments being circumferentially aligned with each other in a complementary association with each other, said first and second radially enlarged integral portions being formed from said single-piece rotatable shaft; and a magnetically sensitive device disposed proximate said first and second radially enlarged integral portions of said shaft and aligned with a plane which extends between said first and second radially enlarged integral portions of said shaft, said plane being generally perpendicular to said central axis.

8. The sensor of claim 7, wherein:

said magnetically sensitive device comprises a magnetoresistive component.

9. The sensor of claim 7, further comprising:

a plurality of cams formed as part of said shaft.

10. The sensor of claim 9, wherein:

said first, second, third and fourth surfaces are each formed in the shape of arcuate sections of a cylindrical surface.

11. The sensor of claim 10, wherein:

said first, second, third and fourth segments are machined from a common single radially enlarged integral portion of said shaft.

12. An angular position sensor, comprising:

a single-piece rotatable shaft having a central axis;

a first radially enlarged integral portion of said shaft having a first segment and a second segment, said first segment having a first surface at a first radial distance from said central axis and said second segment having a second surface at a second radial distance from said central axis;

a second radially enlarged integral portion of said shaft having a third segment and a fourth segment, said third segment having a third surface at a third radial distance from said central axis and said fourth segment having a fourth surface at a fourth radial distance from said central axis, said first and second radially enlarged integral portions of said shaft being disposed in axially adjacent relation with each other, said first and second radially enlarged integral portions of said shaft each comprising ferromagnetic material, said first and fourth segments being circumferentially aligned with each other in a complementary association with each other, said second and third segments being circumferentially aligned with each other in a complementary association with each other, said first and second radially enlarged integral portions being formed from said single-piece rotatable shaft;

a magnetically sensitive device disposed proximate said first and second radially enlarged integral portions of said shaft and aligned with a plane which extends between said first and second radially enlarged integral portions of said shaft, said plane being generally perpendicular to said central axis; and a plurality of cams formed as part of said shaft.

13. The sensor of claim 12, wherein:

said magnetically sensitive device comprises a magnetoresistive component.

14. The sensor of claim 12, wherein:

said first, second, third and fourth surfaces are each formed in the shape of arcuate sections of a cylindrical surface.

15. The sensor of claim 14, wherein:

said first, second, third and fourth segments are machined from a common single radially enlarged integral portion of said shaft.

* * * * *